(12) United States Patent
Yadav et al.

(10) Patent No.: US 12,546,226 B1
(45) Date of Patent: Feb. 10, 2026

(54) VARIABLE PITCH FAN BLADE RETENTION SYSTEM

(71) Applicant: General Electric Company, Schenectady, NY (US)

(72) Inventors: Abhijeet Jayshingrao Yadav, Karad (IN); Nicholas M. Daggett, Camden, ME (US); Nicholas Joseph Kray, Mason, OH (US); Nitesh Jain, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/796,528

(22) Filed: Aug. 7, 2024

(51) Int. Cl.
*F01D 7/00* (2006.01)
*F01D 25/16* (2006.01)

(52) U.S. Cl.
CPC .............. *F01D 7/00* (2013.01); *F01D 25/16* (2013.01); *F05D 2220/36* (2013.01); *F05D 2240/50* (2013.01); *F05D 2260/30* (2013.01)

(58) Field of Classification Search
CPC ........ F01D 7/00; F01D 25/16; F05D 2220/36; F05D 2240/50; F05D 2260/30
See application file for complete search history.

(56) References Cited

U.S. PATENT DOCUMENTS

| | | | | |
|---|---|---|---|---|
| 2,499,837 | A * | 3/1950 | Sheets | F16C 33/60 384/534 |
| 3,781,131 | A | 12/1973 | McMurtry | |
| 4,738,590 | A * | 4/1988 | Butler | F01D 7/00 416/129 |
| 6,015,264 | A | 1/2000 | Violette et al. | |
| 8,827,653 | B2 | 9/2014 | Bouru et al. | |
| 10,072,510 | B2 * | 9/2018 | Miller | F01D 7/00 |
| 10,077,674 | B2 * | 9/2018 | Miller | F02C 3/04 |
| 10,100,653 | B2 * | 10/2018 | Niergarth | F01D 5/3007 |
| 10,465,701 | B2 * | 11/2019 | Craig | F04D 29/323 |
| 11,572,889 | B2 * | 2/2023 | Millier | F04D 29/362 |
| 11,873,076 | B2 * | 1/2024 | Cottet | F01D 7/00 |
| 11,993,365 | B2 | 5/2024 | Cottet et al. | |
| 12,134,971 | B2 * | 11/2024 | Miller | F01D 5/3023 |
| 2010/0239421 | A1 * | 9/2010 | Boston | F04D 29/323 416/136 |
| 2022/0098991 | A1 | 3/2022 | Kray et al. | |
| 2022/0372884 | A1 | 11/2022 | Kray et al. | |
| 2023/0126551 | A1 | 4/2023 | Niergarth et al. | |

FOREIGN PATENT DOCUMENTS

| | | |
|---|---|---|
| FR | 3120660 A1 | 9/2022 |
| GB | 2251896 A | 7/1992 |
| WO | WO2023/275470 A1 | 1/2023 |
| WO | WO2023/027908 A1 | 3/2023 |
| WO | WO2023/031522 A1 | 3/2023 |
| WO | WO2023/037063 A1 | 3/2023 |
| WO | WO2023/052718 A1 | 4/2023 |

* cited by examiner

*Primary Examiner* — Jesse S Bogue

(74) *Attorney, Agent, or Firm* — Dority & Manning, P.A.

(57) ABSTRACT

A variable pitch fan for a gas turbine engine includes a hub, a fan blade supported by the hub, the fan blade including a blade root, and a retention system including a bearing and a retainer, the retainer securing the bearing to the blade root. The hub is rotatably supported by the bearing.

13 Claims, 7 Drawing Sheets

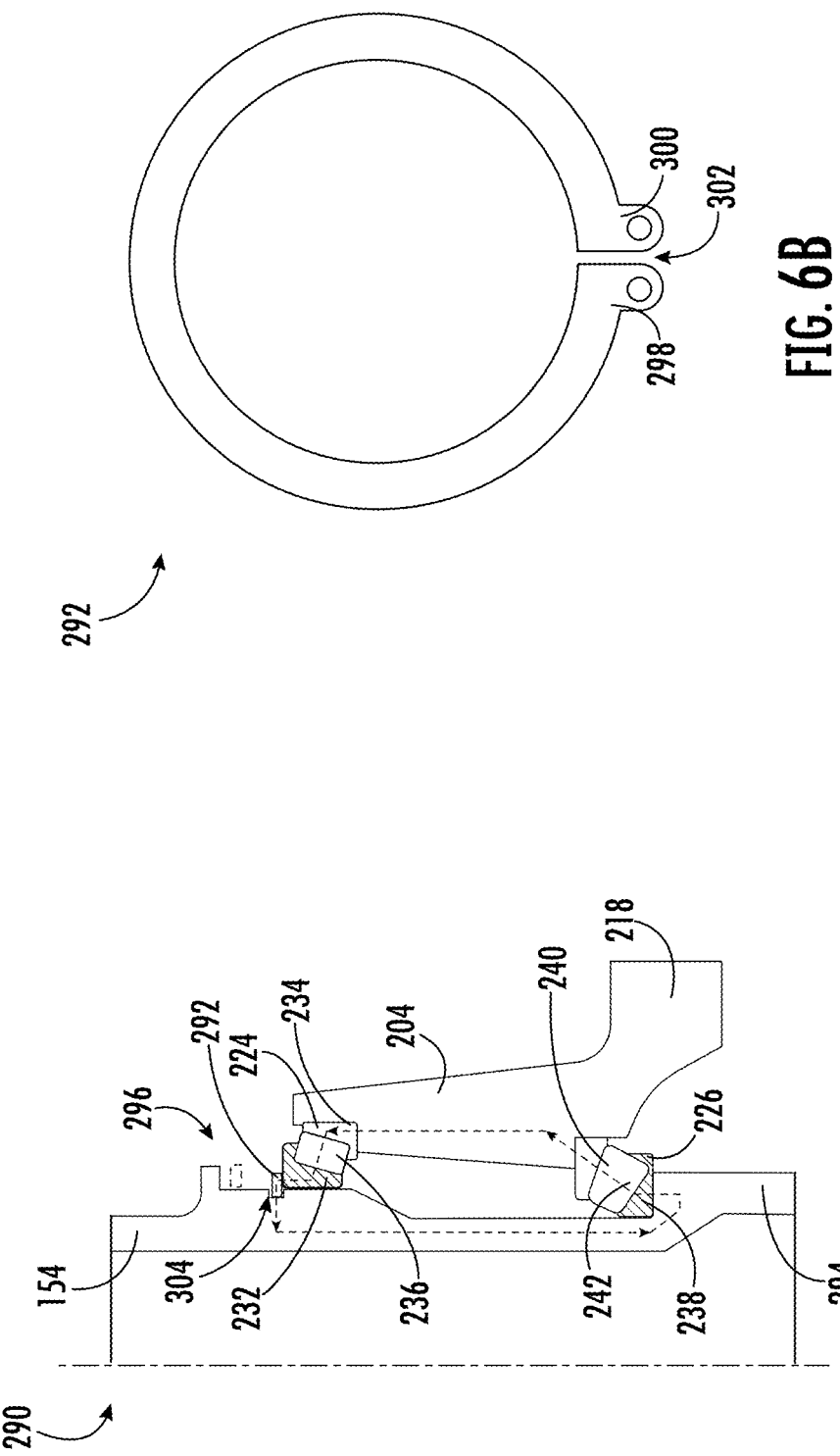

VARIABLE PITCH FAN BLADE RETENTION SYSTEM

FIELD

The present disclosure relates to a retention system for a variable pitch fan blade in a gas turbine engine.

BACKGROUND

A gas turbine engine generally includes a fan and a core arranged in flow communication with one another. For at least some gas turbine engines, the fan is a variable pitch fan including a plurality of fan blades. Each of the fan blades may be rotatably attached to a disk about respective pitch axes, and the disk may be rotatable about a central axis by the one or more shafts of the core.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6A is a schematic, cross-sectional view of another exemplary variable pitch fan blade.

FIG. 6B is a view of a retainer for the exemplary variable pitch fan blade of FIG. 6A.

DETAILED DESCRIPTION

Figure 1:
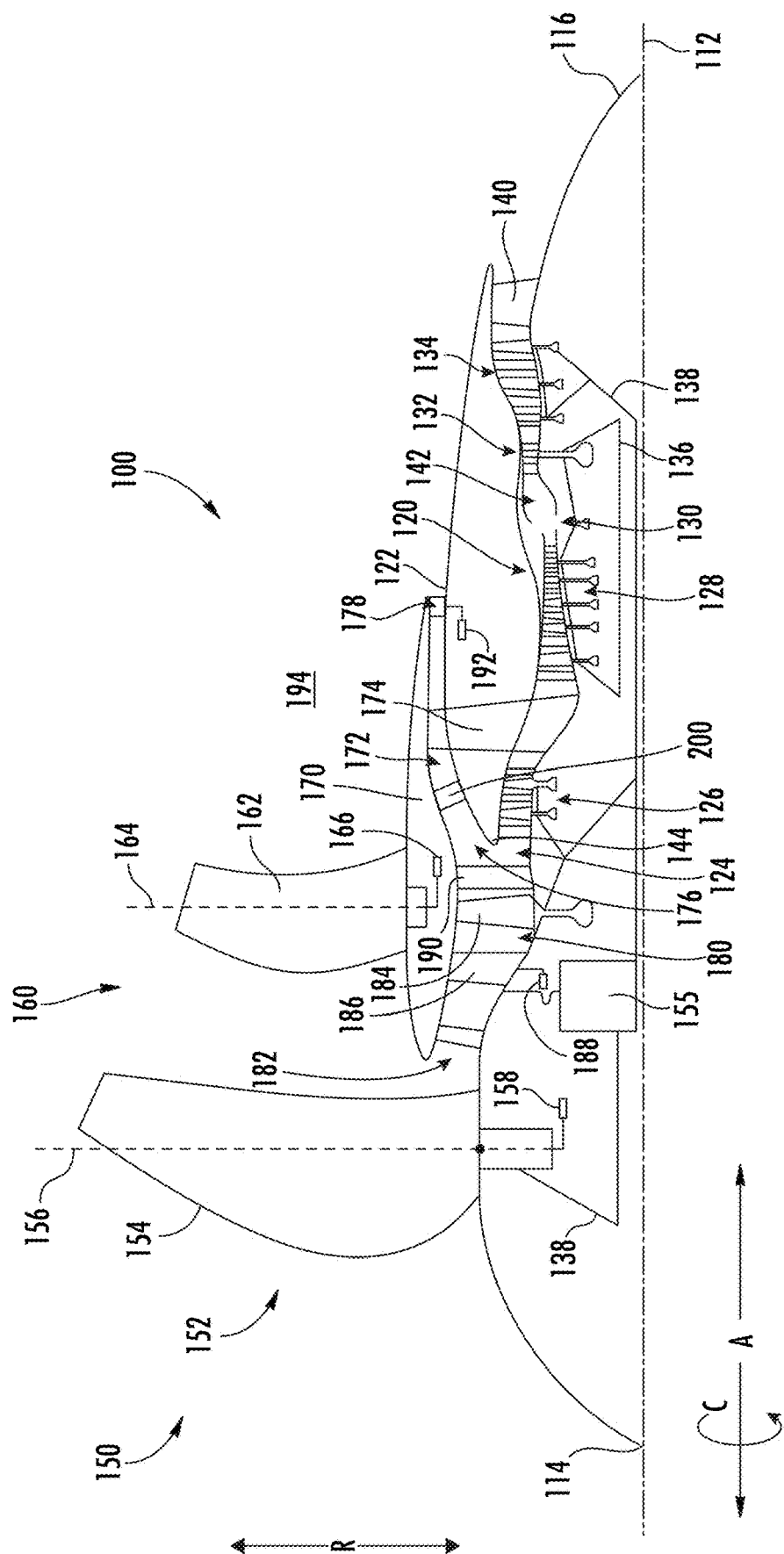
FIG. 1 is a schematic view of a gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first," "second," "third," and other ordinals are used to distinguish one component from another and are not intended to signify location or importance of the individual components.

The present disclosure is generally related to variable pitch fan blades and retention systems thereof. When the fan blade is attached to a disk, loose-fitting components such as bearings may shift from vibrations induced by movement of the fan blade. Moreover, the components may be exposed to external contaminants, and additional surface coatings may need to be applied to protect the components from such exposure. Particularly for bearings, the specific configuration of the fan blade and the disk may specify split inner races, which increases the complexity of assembly and further subjects the bearings to external contaminants.

A retention system for the variable pitch fan blade includes a retainer that secures one of the bearings to the fan blade. By securing the bearing to the fan blade, the retainer preloads the bearing, reducing or inhibiting loosening of the bearing during vibrations caused by the fan blade. The retainer further protects the bearings from external contaminants, reducing or eliminating surface coatings. The retainer further allows the use of monolithic, 360 degree inner races for the bearings, which reduces complexity of assembly and potential contamination.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an "unducted fan," and the entire gas turbine engine 100 may be referred to as an "open rotor gas turbine engine." In addition, the gas turbine engine 100 of FIG. 1 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through the annular core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure ("HP") turbine 132. The HP turbine 132 drives the HP compressor 128 through a high pressure ("HP") shaft 136. In this regard, the HP turbine 132 is drivingly coupled with the HP compressor 128. The high energy combustion products then flow to a low pressure ("LP") turbine 134. The LP turbine 134 drives the LP compressor 126 and components of the fan section 150 through a low pressure ("LP") shaft 138. In this regard, the LP turbine 134 is drivingly coupled with the LP compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the annular core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between the engine inlet 182 and the annular core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
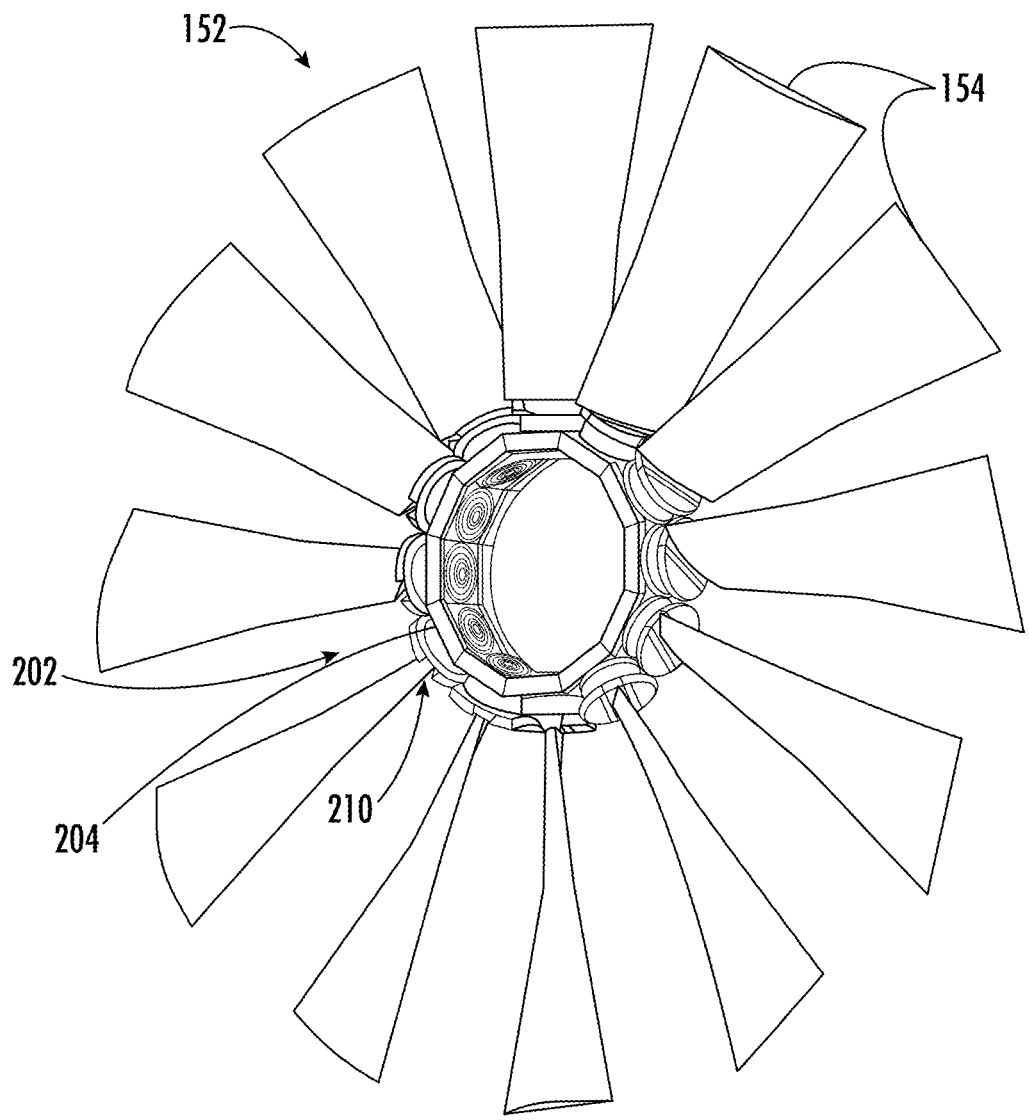
FIG. 2 is a perspective view of a variable pitch fan of the gas turbine engine.

Referring now to FIG. 2, a perspective view of the fan 152 is shown. For the exemplary embodiment depicted, the fan 152 includes twelve (12) fan blades 154. Such a blade count enables the span of each fan blade 154 to be reduced such that the overall diameter of the fan 152 may also be reduced. In other embodiments, the fan 152 may have any suitable blade count and any suitable diameter. For example, the fan 152 may have at least eight (8) fan blades 154, at least fifteen (15) fan blades 154, or at least eighteen (18) fan blades 154.

The fan blades 154 are supported by a disk 202 including a plurality of disk segments 204. The disk segments 204 are coupled or molded together in a generally annular shape, such as a polygon. One fan blade 154 is coupled to each disk segment 204 with a retention system (further described in detail below), such a trunnion, that facilitates retaining its associated fan blade 154 on the disk 202 during rotation of the disk 202. That is, the retention system facilitates providing a load path to the disk 202 for centrifugal loads generated by the fan blades 154 during rotation about the longitudinal axis 112 while still rendering its associated fan blade 154 relative to the disk about the blade axis 156.

Figure 3B:
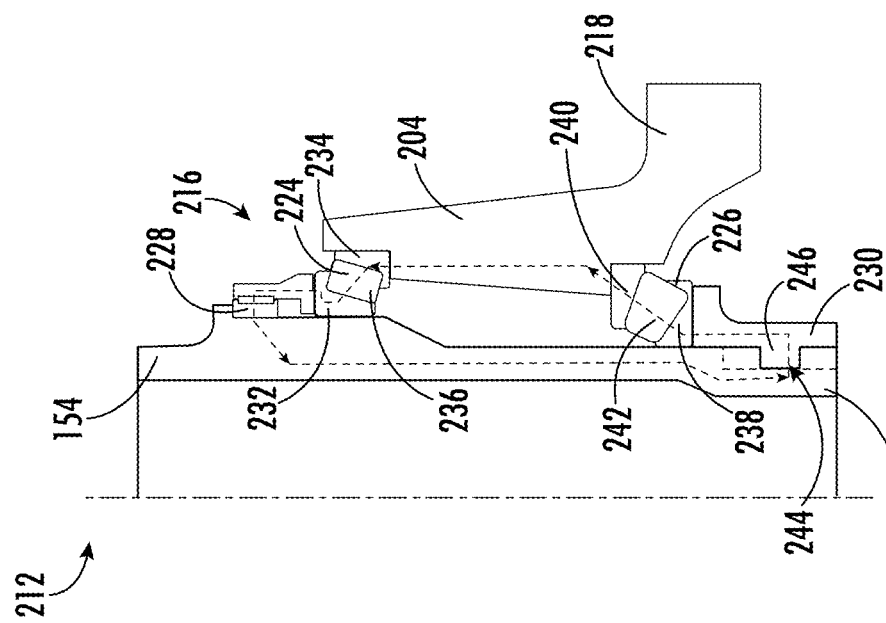
FIGS. 3A-3D are schematic, cross-sectional views of an exemplary variable pitch fan blade.
Figure 3A:
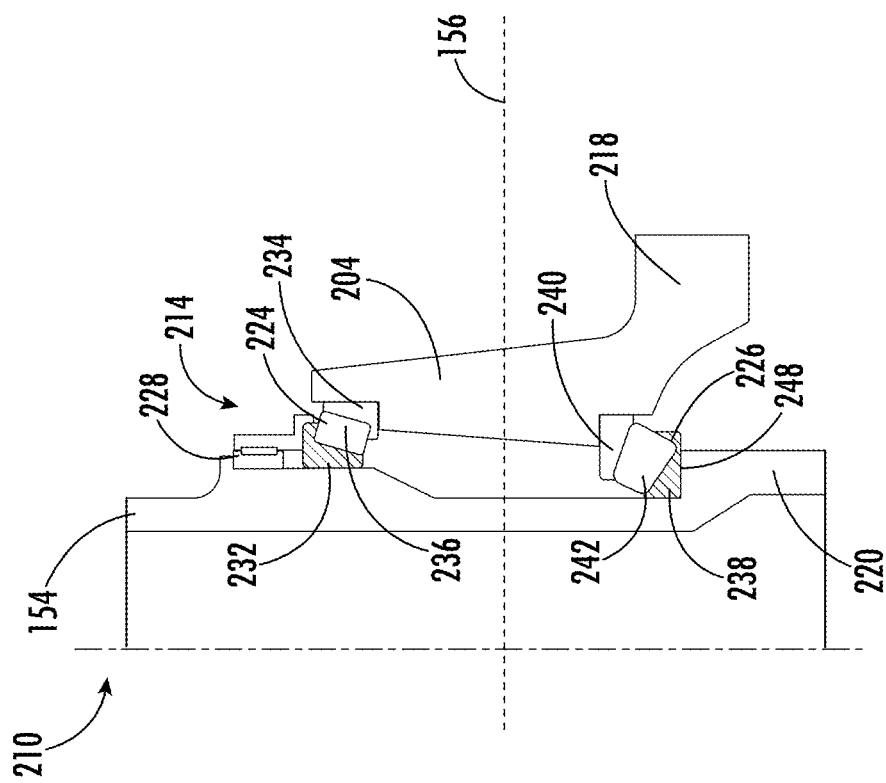
Figure 3C:
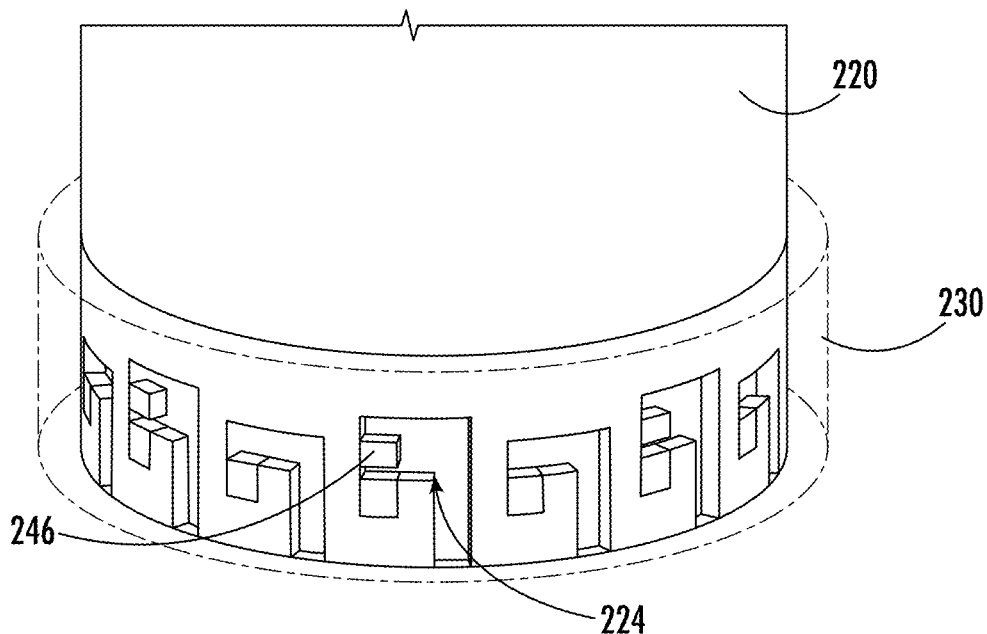
Figure 3D:
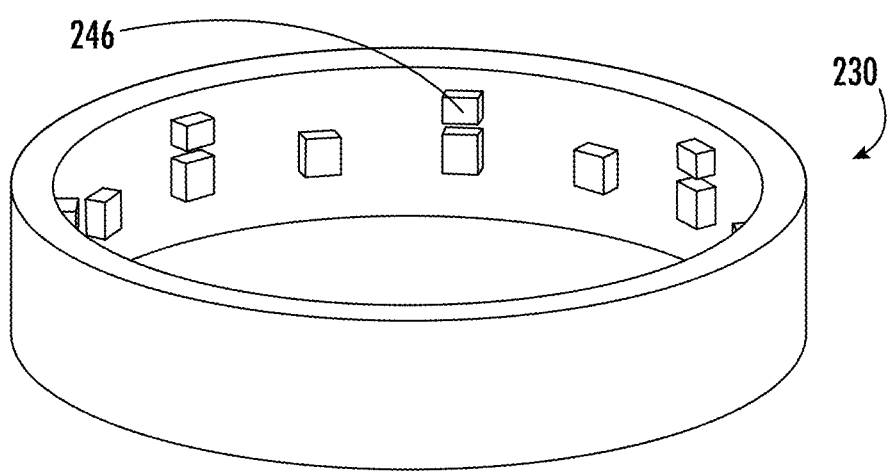

Now referring to FIGS. 3A-3D, magnified views of a variable pitch fan 210, 212 are shown. FIG. 3A shows the variable pitch fan 210 with a retention system 214 securing a fan blade 154 to a disk segment 204. FIG. 3B shows the variable pitch fan 212 with a retention system 216 securing a fan blade 154 to a disk segment 204. FIG. 3C is a perspective view of the fan blade 154 with a retention ring 230. FIG. 3D is a perspective view of the retention ring 230. It will be appreciated that, the fan 152 may be one of the exemplary embodiments of the variable pitch fan described below.

The variable pitch fan 210, 212 includes a hub 218 and a fan blade 154 supported by the hub 218. The hub 218 is a portion of the disk segment 204 to which the fan blade 154 is secured. The fan blade 154 includes a blade root 220 (FIG. 3A), 222 (FIG. 3B) that is secured to the hub 218. More specifically, the hub 218 provides a load path that transfers the centrifugal load generated by the fan blade 154 from the blade root 220, 222 to the rest of the disk 202. As described above, the fan blade 154 defines a blade axis 156, and the blade root 220, 222 extends perpendicular to the blade axis 156. The hub 218 remains stationary relative to the rest of the disk segment 204 while the fan blade 154 rotates about the blade axis 156.

The variable pitch fan 210, 212 includes the retention system 214, 216 that secures the fan blade 154 to the hub 218. The retention system 214 of FIG. 3A includes a first bearing 224, a second bearing 226, and a retainer 228. The retention system 216 of FIG. 3B includes a first bearing 224, a second bearing 226, and a retainer 228 and further includes a retention ring 230. It will be appreciated that, where similar parts are used in the FIGS., similar numbers will refer to those similar parts.

The first bearing 224 and the second bearing 226 extend from the fan blade 154 to the hub 218, specifically from the blade root 220, 222 to the hub 218. The first and second bearings 224, 226 rotatably engage the hub 218 and rotatably support the fan blade 154, allowing the blade root 220, 222 to rotate relative to the hub 218. More specifically, as the fan blade 154 rotates about the blade axis 156 to a specified pitch, the blade root 220, 222 rotates along the bearings 224, 226 while the hub 218 remains stationary. The first bearing 224 has an inner race 232 engaging the blade root 220, 222, an outer race 234 engaging the hub 218, and a plurality of rollers 236 disposed between the inner race 232 and the outer race 234. The rollers 236 (such as balls, cylinders, or the like) allow the inner race 232 and the outer race 234 to rotate relative to each other. The second bearing 226 has an inner race 238 engaging the blade root 220, 222, an outer race 240 engaging the hub 218, and a plurality of rollers 242 disposed between the inner race 238 and the outer race 240. The outer races 234, 240 of the first and second bearings 224, 226 are monolithic structures with no gaps or disconnections. The inner races 232, 238 of the first and second bearings 224, 226 may be split races (as shown in FIG. 3A with cross-hatching) or monolithic structures (as shown in FIG. 3B with a solid fill). The blade root 220, 222 and the hub 218 enclose the first and second bearings 224, 226, reducing or inhibiting exposure of the first and second bearings 224, 226 to external contaminants.

The retention system 214, 216 includes the retainer 228, which secures one of the first bearing 224 or the second bearing 226 to the blade root 220, 222 without engaging the hub 218. In the exemplary embodiments of FIGS. 3A-3B, the retainer 228 secures the first bearing 224 to the blade root 220, 222. More specifically, the retainer 228 secures the inner race 232 of the first bearing 224 to the blade root 220, 222. Such an arrangement provides improved retention of the retainer 228 by reducing the radial loads experienced by the retainer 228. The retainer 228 may be a lock nut that, when tightened, prevents loosening of components secured by the lock nut. That is, the lock nut may include a locking mechanism, such as a unidirectional thread, that allows rotation of the lock nut in a locking direction and inhibits or prevents rotation of the lock nut in a loosening direction. The retainer 228, when tightened, preloads the inner race 232 of the first bearing 224 to reduce the effect of forces that could loosen the first bearing 224. For example, preloading the first bearing 224 may reduce or inhibit vibrations from the fan blade 154 from loosening the first bearing 224 from the blade root 220, 222. As another example, preloading the first bearing 224 reduces loads from thermal growth, assembly tolerances, operating deflections, or combinations thereof. Such preloading reduces wear and fretting on the first bearing 224.

As shown in FIG. 3A, the inner race 238 of the second bearing 226 is supported directly by the blade root 220. Specifically, the blade root 220 includes a ledge 248, and the second bearing 226 is disposed between the hub 218 and the ledge 248. The inner race 238 of the second bearing 226 is a split race, which allows for self-alignment and flexible sealing with the blade root 220. The ledge 248 may block contaminants from reaching the split race, improving rotational operation of the second bearing 226.

As shown in FIGS. 3B-3D, the retention system 216 may include a retention ring 230. The retention ring 230 supports the second bearing 226 as an additional securing feature. Specifically, with the retention ring 230, the inner race 238 of the second bearing 226 is a monolithic structure protected from contaminants by the retention ring 230. The retention ring 230 is secured to the blade root 222 in a manner to inhibit loosening of the retention ring 230 from the blade root 222 and to secure the second bearing 226.

As shown in FIGS. 3C-3D, the blade root 222 defines a plurality of slots 244 and the retention ring 230 includes a plurality of extensions 246 that is disposed in the slots 244. The extension 246 forms a friction fit with the blade root 222, securing the second bearing 226 in place. Notably, inclusion of the retention ring 230 allows for the first and second bearings 224, 226 to include monolithic inner and outer races 232, 234, 238, 240. In particular, the retention ring 230 may replace the need for a ledge (e.g., ledge 248 in FIG. 3A) to support the second bearing 226, which may require use of a split inner race 238.

Figure 4B:
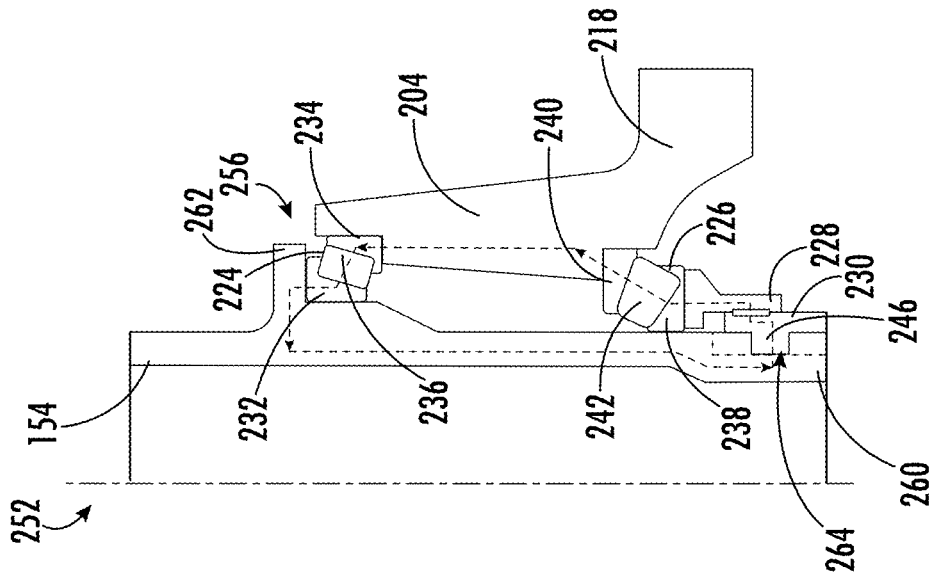
FIGS. 4A-4B are schematic, cross-sectional views of another exemplary variable pitch fan blade.
Figure 4A:
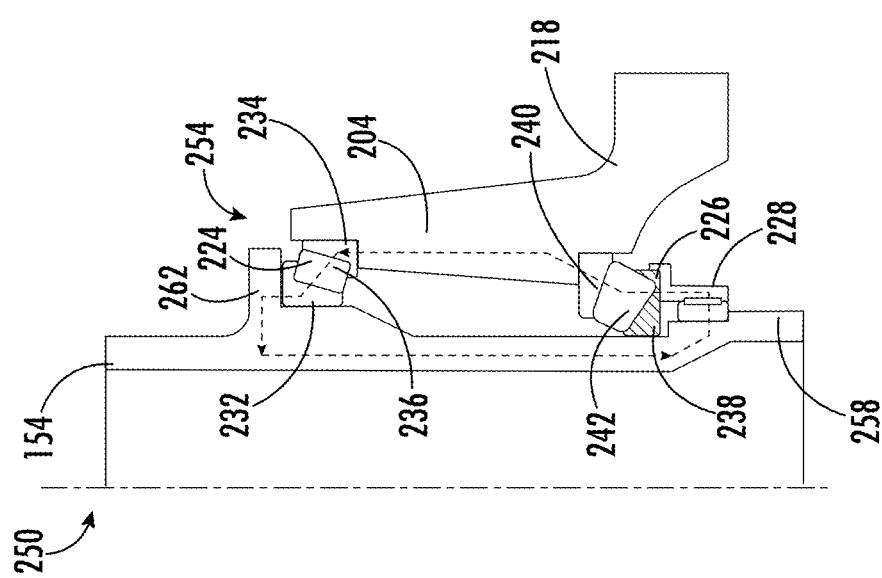

Now referring to FIGS. 4A-4B, magnified views of a variable pitch fan 250, 252 are shown. FIG. 4A shows the variable pitch fan 250 with a retention system 254 securing a fan blade 154 to a disk segment 204. FIG. 4B shows the variable pitch fan 252 with a retention system 256 securing a fan blade 154 to a disk segment 204.

The variable pitch fan 250, 252 of FIGS. 4A-4B includes a fan blade 154 including a blade root 258, 260, a hub 218, and the retention system 254, 256 to secure the blade root 258, 260 to the hub 218. The retention system 254 of FIG. 4A includes a first bearing 224, a second bearing 226, and a retainer 228, similar to those shown in FIG. 3A. The first bearing 224 includes an inner race 232 and an outer race 234, and the second bearing 226 includes an inner race 238 and an outer race 240. The retention system 256 of FIG. 4B includes a first bearing 224, a second bearing 226, and a retainer 228, and further includes a retention ring 230, similar to that shown in FIG. 3B.

As shown in FIG. 4A, the retainer 228 secures the second bearing 226 to the blade root 258, and the first bearing 224 is supported by a ledge 262 of the blade root 258. The retainer 228 (which is a lock nut in this exemplary embodiment, similar to FIGS. 3A-3B) preloads the inner race 238 of the second bearing 226, reducing or inhibiting vibrations that may loosen the blade root 258 from the hub 218. The inner race 238 of the second bearing 226 is a split race, while the outer race 240 of the second bearing 226, the inner race 232 of the first bearing 224, and the outer race 234 of the first bearing 224 are monolithic structures.

As shown in FIG. 4B, the retention system 256 includes the retention ring 230. The retention ring supports the second bearing 226. The retention ring 230 includes an extension 246 that is disposed in a slot 264 defined in the blade root 260. The retainer 228 secures the second bearing 226 to the retention ring 230, reducing or inhibiting vibrations that may loosen the blade root 260 from the hub 218. Because the retention system 256 includes the retention ring 230, the inner race 238 of the second bearing 226 of FIG. 4B is a monolithic structure, which reduces or inhibits contamination of the second bearing 226.

Figure 5B:
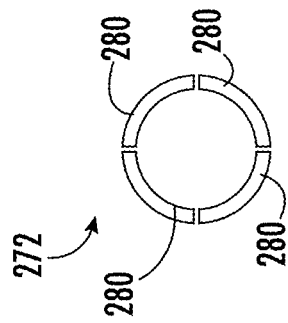
FIG. 5B is a view of a retainer for the exemplary variable pitch fan blade of FIG. 5A.
Figure 5A:
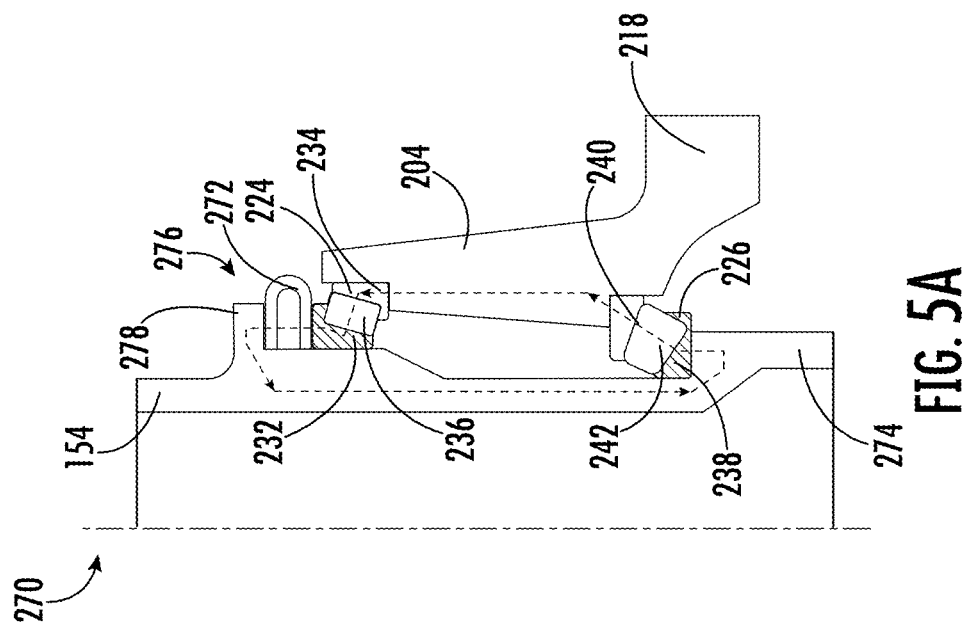
FIG. 5A is a schematic, cross-sectional view of another exemplary variable pitch fan blade.

Now referring to FIGS. 5A-5B, a magnified view of a variable pitch fan 270 is shown. FIG. 5A shows the variable pitch fan 270 with a retainer 272 that is a spring. FIG. 5B shows a magnified view of the spring.

The variable pitch fan 270 of FIG. 5A includes a fan blade 154 including a blade root 274, a hub 218, and a retention system 276 to secure the blade root 274 to the hub 218. The retention system 276 includes a first bearing 224, a second bearing 226, and the retainer 272. The first bearing 224 includes an inner race 232 and an outer race 234, and the second bearing 226 includes an inner race 238 and an outer race 240. The inner races 232, 238 of the first and second bearings 224, 226 are split races, and the outer races 234, 240 of the first and second bearings 224, 226 are monolithic structures.

As shown in FIG. 5B, the retainer 272 is a spring. The spring is compressed between a ledge 278 of the blade root 274 and the first bearing 224, preloading the inner race of the first bearing 224. The spring may be any suitable structure, such as a flexible ring, a coil, a torsion spring, a leaf spring, a clock spring, or combinations thereof. In the exemplary embodiment of FIG. 5B, the spring is substantially circular and includes a plurality of segments 280 that are configured to elastically deform relative to each other. When deformed. The segments 280 provide tension that applies forces to the ledge 278 of the blade root 274 and to the first bearing 224, preloading the first bearing 224. The forces applied by the retainer 272 reduce or inhibit movement of the first bearing 224 from vibrations.

Now referring to FIGS. 6A-6B, a magnified view of a variable pitch fan 290 is shown. FIG. 6A shows the variable pitch fan 290 with a retainer 292 that is a split ring. FIG. 6B shows a magnified view of the split ring.

The variable pitch fan of FIG. 6A includes a fan blade 154 including a blade root 294, a hub 218, and a retention system 296 to secure the blade root to the hub 218. The retention system includes a first bearing 224, a second bearing 226, and a retainer 292. The first bearing 224 includes an inner race 232 and an outer race 234, and the second bearing 226 includes an inner race 238 and an outer race 240. The inner races 232, 238 of the first and second bearings 224, 226 are split races, and the outer races 234, 240 of the first and second bearings 224, 226 are monolithic structures.

As shown in FIG. 6B, the retainer 292 is a split ring. The split ring includes a first end 298 and a second end 300. The first end 298 and the second end 300 define a gap 302 therebetween. The first end 298 is movable away from the second end 300, causing tension in the remainder of the retainer 292. The tension urges the first end 298 toward the second end 300, imparting compressive forces on objects between the first end 298 and the second end 300.

Referring back to FIG. 6A, the retainer 292 is disposed within a slot 304 defined in the blade root 294, contacting the inner race 232 of the first bearing 224. The blade root 294 separates the first end 298 of the split ring from the second end 300 of the split ring (not shown), causing tension in the retainer 292. The tension retains the first bearing 224, reducing or inhibiting movement of the first bearing 224 from vibrations, thermal loads, assembly tolerances, and combinations thereof.

Vibrations induced by movement of the fan blade may cause loose-fitting components such as bearings to shift from their initial positions. Particularly for bearings, split inner races may increase the complexity of assembly and further subject the bearings to external contaminants. By securing the bearing to the fan blade with a retainer that does not engage the hub, the retainer preloads the bearing, reducing or inhibiting loosening of the bearing during vibrations caused by the fan blade. The retainer further protects the bearings from external contaminants, reducing or eliminating surface coatings, and allows for the use of 360 degree monolithic races.

Further aspects are provided by the subject matter of the following clauses:

A variable pitch fan for a gas turbine engine includes a hub, a fan blade including a blade root, and a retention system including a bearing extending from the hub to the blade root and a retainer, the retainer securing the bearing to the blade root, wherein the fan blade is rotatably supported by the bearing.

The variable pitch fan of any of the previous clauses, wherein the retention system further includes a second bearing, wherein the fan blade is rotatably supported by the second bearing.

The variable pitch fan of any of the previous clauses, wherein the retention system further includes a retention ring, wherein the retention ring supports the bearing or the retainer.

The variable pitch fan of any of the previous clauses, wherein the blade root defines a slot and the retention ring includes an extension disposed in the slot.

The variable pitch fan of any of the previous clauses, wherein the retention system further includes a second bearing, wherein the blade root includes a ledge, and wherein the second bearing is disposed between the hub and the ledge.

The variable pitch fan of any of the previous clauses, wherein the ledge supports an inner race of the bearing.

The variable pitch fan of any of the previous clauses, wherein the retainer is one of a lock nut, a spring, or a split ring.

The variable pitch fan of any of the previous clauses, wherein the blade root and the hub enclose the bearing.

The variable pitch fan of any of the previous clauses, wherein the bearing includes an inner race and an outer race, the outer race being a monolithic structure.

The variable pitch fan of any of the previous clauses, wherein the inner race is a split race.

The variable pitch fan of any of the previous clauses, wherein the inner race is a monolithic structure.

The variable pitch fan of any of the previous clauses, wherein the fan blade defines a blade axis and the blade root is perpendicular to the blade axis.

The variable pitch fan of any of the previous clauses, wherein the retainer extends from the bearing to the blade root without engaging the hub.

A retention system for a variable pitch fan includes a first bearing, a second bearing, and a retainer, wherein the retainer secures one of the first bearing or the second bearing to a fan blade of the variable pitch fan when the retention system is installed in the variable pitch fan, wherein the first bearing and the second bearing are arranged to retain a hub of the variable pitch fan to the fan blade when the retention system is installed in the variable pitch fan.

The retention system of any of the previous clauses, further including a retention ring, wherein the retention ring supports the first bearing, the second bearing, or the retainer.

The retention system of any of the previous clauses, wherein the retention ring includes an extension disposed in the fan blade when the retention system is installed in the variable pitch fan.

The retention system of any of the previous clauses, wherein the retainer is one of a lock nut, a spring, or a split ring.

The retention system of any of the previous clauses, wherein the first bearing includes an inner race and an outer race, the outer race being a monolithic structure.

The retention system of any of the previous clauses, wherein the inner race is a split race.

The retention system of any of the previous clauses, wherein the retainer secures the inner race of the first bearing to the fan blade.

A gas turbine engine includes a fan section including a variable pitch fan including a hub, a fan blade, and a retention system including a bearing extending from the hub to the blade root and a retainer, the retainer securing the bearing to the fan blade, wherein the fan blade is rotatably supported by the bearing, and a turbomachine downstream of the fan section, the turbomachine including, in serial flow order, a compressor section, a combustion section, and a turbine section.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A variable pitch fan for a gas turbine engine, the variable pitch fan comprising:
   a hub;
   a fan blade including a blade root, wherein the blade root defines a plurality of slots; and
   a retention system including a first bearing and a second bearing extending from the hub to the blade root, a retainer in contact with and securing the first bearing to the blade root, and a retention ring in contact with and securing the second bearing to the blade root, wherein the retention ring includes a plurality of extensions disposed in the plurality of slots;
   wherein the fan blade is rotatably supported by the first bearing and the second bearing.

2. The variable pitch fan of claim 1, wherein the retainer is one of a lock nut, a spring, or a split ring.

3. The variable pitch fan of claim 1, wherein the blade root and the hub enclose the bearing.

4. The variable pitch fan of claim 1, wherein the bearing includes an inner race and an outer race, the outer race being a monolithic structure.

5. The variable pitch fan of claim 4, wherein the inner race is a split race.

6. The variable pitch fan of claim 4, wherein the inner race is a monolithic structure.

7. The variable pitch fan of claim 1, wherein the retainer extends from the bearing to the blade root without engaging the hub.

8. A retention system for a variable pitch fan, the retention system comprising:
   a first bearing;
   a second bearing;
   a retainer; and
   a retention ring;
   wherein the retainer is in contact with and secures the first bearing to a fan blade of the variable pitch fan and the retention ring is in contact with and secures the second bearing to the fan blade when the retention system is installed in the variable pitch fan,
   wherein the retention ring includes a plurality of extensions disposed in a plurality of slots defined by the fan blade when the retention system is installed in the variable pitch fan, and
   wherein the first bearing and the second bearing are arranged to retain a hub of the variable pitch fan to the fan blade when the retention system is installed in the variable pitch fan.

9. The retention system of claim 8, wherein the retainer is one of a lock nut, a spring, or a split ring.

10. The retention system of claim 8, wherein the first bearing includes an inner race and an outer race, the outer race being a monolithic structure.

11. The retention system of claim 10, wherein the inner race is a split race.

12. The retention system of claim 10, wherein the retainer secures the inner race of the first bearing to the fan blade.

13. A gas turbine engine comprising:
   a fan section including a variable pitch fan comprising:
      a hub;
      a fan blade, wherein the fan blade includes a blade root defining a plurality of slots; and
      a retention system including a first bearing and a second bearing extending from the hub to the fan blade, a retainer in contact with and securing the first bearing to the fan blade, and a retention ring in contact with and securing the second bearing to the fan blade, wherein the retention ring includes a plurality of extensions disposed in the plurality of slots;
      wherein the fan blade is rotatably supported by the first bearing and the second bearing; and
   a turbomachine downstream of the fan section, the turbomachine including, in serial flow order, a compressor section, a combustion section, and a turbine section.

* * * * *